(12) United States Patent
Ijzerman et al.

(10) Patent No.: US 7,548,670 B2
(45) Date of Patent: Jun. 16, 2009

(54) THIN AND EFFICIENT LIGHT COLLIMATING DEVICE

(75) Inventors: Willem Lubertus Ijzerman, Eindhoven (NL); Michel Cornelis Josephus Marie Vissenberg, Eindhoven (NL); Marcellinus Petrus Carolus Michael Krijn, Eindhoven (NL); Hugo Johan Cornelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/092,990

(22) PCT Filed: Oct. 27, 2006

(86) PCT No.: PCT/IB2006/053963

§ 371 (c)(1),
(2), (4) Date: May 8, 2008

(87) PCT Pub. No.: WO2007/054848

PCT Pub. Date: May 18, 2007

(65) Prior Publication Data

US 2008/0252986 A1    Oct. 16, 2008

(30) Foreign Application Priority Data

Nov. 14, 2005  (EP) ................................. 05110683

(51) Int. Cl.
*G02B 6/32* (2006.01)

(52) U.S. Cl. .......................... 385/33; 385/129; 385/146; 359/443; 359/641

(58) Field of Classification Search .................... 385/33
See application file for complete search history.

(56) References Cited

U.S. PATENT DOCUMENTS

| 3,735,124 | A | 5/1973 | Stahihut |
| 5,128,783 | A | 7/1992 | Abileah et al. |
| 5,396,350 | A | 3/1995 | Beeson et al. |
| 6,164,799 | A | 12/2000 | Hirmer et al. |
| 2003/0189832 | A1 | 10/2003 | Rizkin et al. |
| 2004/0145910 | A1 | 7/2004 | Lisowski |

FOREIGN PATENT DOCUMENTS

| JP | 07006610 A | 1/1995 |
| JP | 2001067919 A | 3/2001 |
| JP | 2004311162 A | 11/2004 |

*Primary Examiner*—Mary A El Shammaa

(57) ABSTRACT

A light collimation device comprising a wave guide plate (100) having a first surface (101), an opposing faceted second surface (102) comprising a plurality of essentially planar parallel portions (103) and a plurality of facets (104) connecting said planar parallel portions (103) and at least one surface (105) for receiving light is provided. Each facet (104) is formed at a non-right angle ($\beta$) to said planar parallel portions (103) and the device further comprises a plurality of collimating refractive elements (106), wherein each collimating refractive element (106) corresponds to a separate one of the plurality of facets (104), and is located in the beam path of at least the major part of light being reflected on the corresponding facet (104) and extracted from said wave guide plate (100).

19 Claims, 13 Drawing Sheets

THIN AND EFFICIENT LIGHT COLLIMATING DEVICE

The present invention relates to a light collimation device comprising a wave guide plate having a first surface, an opposing faceted second surface comprising a plurality of planar parallel portions and a plurality of facets connecting said planar parallel portions and at least one surface for receiving light. The present invention also relates to a light-emitting device comprising at least one light source and at least one light collimating means.

LEDs are becoming increasingly efficient. The efficiency is increasing (lumen/watt) due to improved thermal efficiency and the use of blue LEDs with a high efficiency that are combined with color converting phosphors.

Unfortunately, LEDs send light in all directions. The emissive surface of an LED is small, but the light rays go from the emissive part in all directions (half sphere approximately, Lambertian radiation pattern). For most applications, a light source is needed with a smaller angular spread. To increase the extraction efficiency and to shape the light output LEDs are provided with primary optics that is placed directly on the LED die (like spherical lenses).

In many applications however, the degree of collimation needed is much higher than can be achieved with primary optics. Therefore, additional optics is added to the illumination system (secondary optics). Typically, in some applications, a collimation of down to approximately 1° is desired.

A commonly used collimating optics is the CPC (Compound Parabolic Collimator). A CPC typically consists of a conical shape of transparent material. A typical CPC consists of a rotationally symmetric shape with an entrance and exit plane connected by a tilted parabola. The CPC is known as an efficient collimator. However, one problem with the CPC is the height required for a high degree of collimation. For instance, using a 1×1 mm LED and seeking a 1° collimation angle yields a 4.7 m long collimator having an exit plane with a radius of 81 mm.

One approach to achieve a collimating optics having a more compact structure is described in US patent application no 2003/0189832 A1, to Rizkin et al, describing a light source and a reflective light transformer for collimating the light emitted by the light source. The reflective light transformer comprises a first reflective member with a shape that is pre-calculated to reflect the light emitted by the light source in a direction generally parallel with the light source, towards a second reflective member with a shape that is pre-calculated to reflect the light from the first reflective member in a direction generally parallel with the light source optical axis. This approach gives a structure which is much more compact than a mere CPC-structure. However, collimating effect shown by this light transformer is not very high (collimation of ±5°).

Thus, there is a need in the art for a collimating optics that can combine efficient collimation (i.e. low angular spread) with a small structure.

It is an object of the present invention to at least partly overcome this problem, and to provide a light-collimating device enabling a high degree of collimation. Another object of the present invention is to provide such a light-collimating device capable of having a low thickness and a high degree of collimation.

These objects are met by a light-collimating device of the present invention.

Thus, in a first aspect, the present invention provides a light collimation device comprising a wave guide plate having a first surface, an opposing faceted second surface comprising a plurality of planar parallel portions and a plurality of facets connecting said planar parallel portions, and at least one surface for receiving light.

In a light collimation device of the present invention each facet is formed at a non-right angle to said planar parallel portions, and the device further comprises a plurality of collimating refractive elements, wherein each collimating refractive element corresponds to a separate one of the plurality of facets.

Each collimating refractive element is located in the beam path of at least the major part of light being reflected on the corresponding facet and extracted from said wave guide plate.

The wave guide plate has a first surface and a second surface, where the second surface consists of a staircase like structure of parallel portions connected by a plurality of slanted surfaces (facets).

The device is provided with a plurality of collimating refractive elements, where each separate collimating refractive elements corresponds to a separate facet in that way that at least the major part of the light which is reflected on the corresponding facet and extracted out from the wave guide plate is received and collimated by the corresponding collimating refractive element.

Typically, the light reflected on a facet is focused towards infinity on the corresponding collimating refractive element.

This yields a high degree of collimation with a light collimating device of the present invention.

After a finite number of facets in the wave guide, essentially all light received into the wave guide is reflected towards the array of collimating refractive elements and is collimated by the collimating refractive elements.

Thus, the light collimation device of the present invention may be a relatively thin structure.

In addition, since essentially all light received into the wave guide plate is reflected towards and collimated by the collimating refractive elements, a high degree of light utilization is obtained by a light collimating device of the present invention.

In some embodiments of the present invention, the facets are preferably formed at such an angle that light received via the surface for receiving light is reflected towards the first surface, i.e. the facets are formed at an angle <90°, typically in the range of from about 15° to 75° from the parallel portions of the second surface. In such embodiments, the collimating refractive elements are arranged on the first surface side of the wave guide plate, such as on or at a distance from the first surface.

In other embodiments of the present invention, the facets are preferably formed at such an angle that light received via the surface for receiving light is reflected towards the first surface, i.e. the facets are formed at an angle >90°, typically in the range of from about 105° to 165° from the parallel portions of the second surface. In such embodiments, the collimating refractive elements are arranged on the second surface side of the wave guide plate, such as on or at a distance from the second surface.

The collimating refractive elements may for example be selected from the group comprising lenses, Fresnel lenses and holographic element. A collimating refracting element may also comprise a plurality of such lenses, Fresnel lenses and/or holographic elements.

In embodiments of the present invention, the ratio between the focal length of a collimating refractive element and the distance from the optical center of said collimating refractive elements to the corresponding facet may be in the range from about 1.2:1 to 1:1.2. For example, the focal plane of a collimating refractive element may intersect with the corresponding facet.

To obtain good collimation it is typically desirable to focus the collimating refractive element on the corresponding facet, or at least close to the corresponding facet.

In some embodiments of the present invention, the wave guide plate may comprise a plurality of superimposed layers each having a first surface and an opposing second surface, wherein the second surface of each layer comprises at least one planar portion and at least one facet formed at an a non-right angle to said planar portion. Such a layered embodiment may be used to separately collimate light from different light sources in one collimating device. Each layer may act as a separate wave guide and each facet corresponds to a separate collimating refractive element, so by associating each separate light source with a separate layer, each light source will be collimated by a separate refractive element.

The reflection on the facets may rely on total internal reflection on the facet surfaces. However, in some embodiments of the present invention, the facets may be provided with a reflective coating.

For relying on total internal reflection on the facets, the angle of the facet surface to the light to be reflected thereon and the relationship between the refractive index of the wave guide and the surrounding material has to fulfill the criteria of total internal reflection according to Snell's law. By arranging a reflective coating on the facet surface, reflection is obtained without regard to Snell's law, increasing the freedom of choice with regard to, for example, the wave guide material and the angle of the facets.

In some embodiments, a device of the present invention may comprise a light-collimating portion arranged in the optical path between the surface for receiving light and the facets of the wave guide plate. Such a collimating portion allows light from a non-collimated light source to be introduced via the receiving area. To obtain the desired angular spread in the wave guide plate, the such a collimating portion may be used to collimate the received light. For example, a portion of the light collimation device, located close to the surface for receiving light, and located in the beam path between the surface for receiving light and the facets of the wave guide plate, may be designed having a light collimating shape, such as a funnel or a CPC (compound parabolic collimator). A collimating device of the present invention may be capable of producing a collimation angle of light exiting said device via said plurality of collimating refractive elements of below 5°, such as below 3°, more preferably below 1.5°, in at least one dimension, which light is received via said surface for receiving light, at least when the light is received with an angular spread of below 20°.

A low collimation angle is desired in many applications, for example where a well defined area is to be illuminated.

In embodiments of the present invention, the wave guide plate may have a symmetry axis essentially perpendicular to the planar portions of the wave guide plate. The surface for receiving light may be symmetric with respect to the symmetry axis.

In certain embodiments of the present invention, the wave guide plate may be rotationally symmetric with respect to the symmetry axis.

Symmetric embodiments of light collimating devices of the present invention may be capable of collimating the received light in both the dimensions of a plane parallel to the first and/or second surface of the device.

In embodiments of the present invention, the collimating refractive elements are arranged on the wave guide plate by means of a material having a refractive index lower than the refractive index said wave guide. This allows for total internal reflection within the wave guide plate if the angle of incidence on this surface is above a critical angle.

In embodiments of the present invention, the surface(s) for receiving light and/or the surfaces of said lenses may be provided with an anti-reflective coating. Such coatings may reduce Fresnel losses in these surfaces, giving a higher light utilization efficiency of the device.

In embodiments of the present invention, two light collimating devices of the present embodiment, a first and a second, may be arranged such that said surface for receiving light in the second light collimating device is arranged to receive light exiting the first light collimating device via the collimating refractive elements of the first light collimating device.

Typically, non-symmetric embodiments of light collimating devices of the present invention are only capable of collimating light in one dimension, giving narrow angular distribution in one dimension while giving a broad angular distribution in the perpendicular dimension. By arranging, as mentioned above, two such collimating devices after each other, the first collimating device may collimate the light in a first dimension, whereas the second collimating device receives this partially collimated light and collimates this light also in the second dimension, perpendicular to the first dimension. Thus a full collimation in two dimensions is provided.

In a second aspect, the present invention provides a light emitting device comprising a light source and a light collimating device of the present invention arranged to receive and collimate light emitted from said light source.

In embodiments of the present invention, a folding mirror may be arranged between the light source and the surface for receiving light of the collimating device.

Further aspects of the present invention will be apparent from the following detailed description of the invention, and included, but are not limited to display devices comprising at least one light collimating device of the present invention.

These and other aspects of the present invention will now be described in more detail, with reference to the appended drawings showing exemplary embodiments of the invention.

FIG. 3b illustrates, in perspective view, the device of FIG. 3a.

FIG. 4b shows an alternative of the embodiment in FIG. 4a.

Figure 5A:
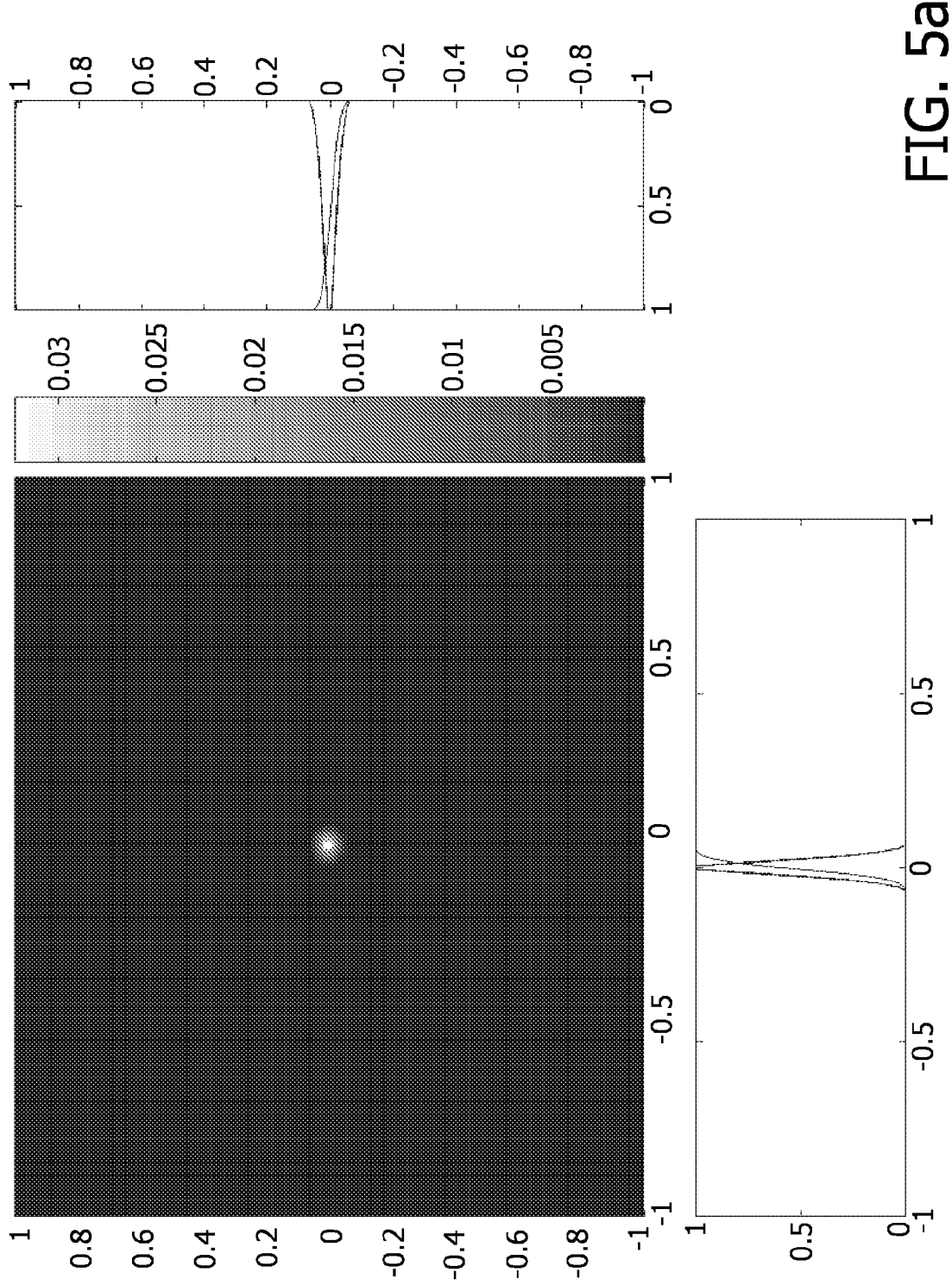
Figure 5B:
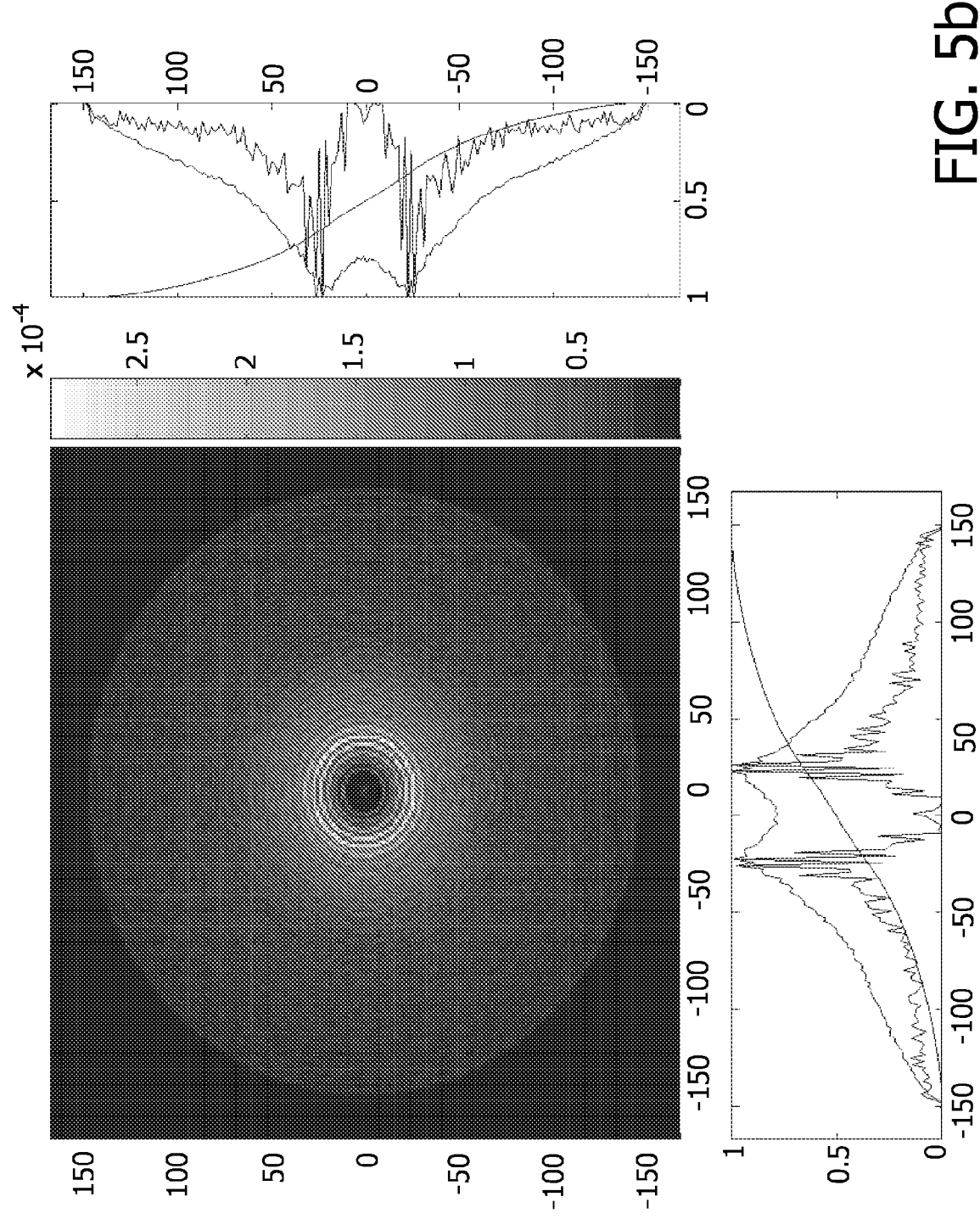
Figure 5C:
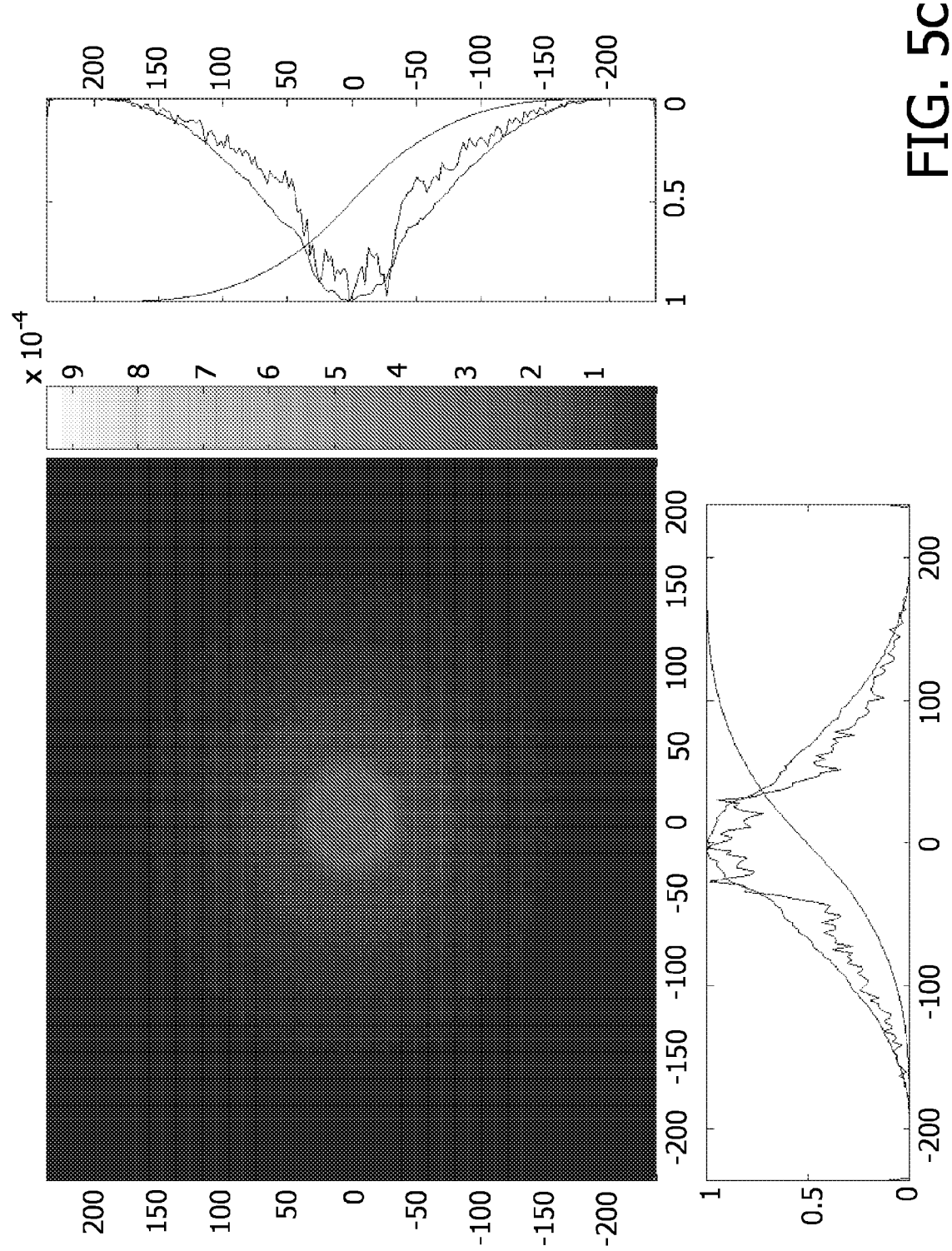

FIG. 5a to c shows results from one of the experiments below.

Figure 6A:
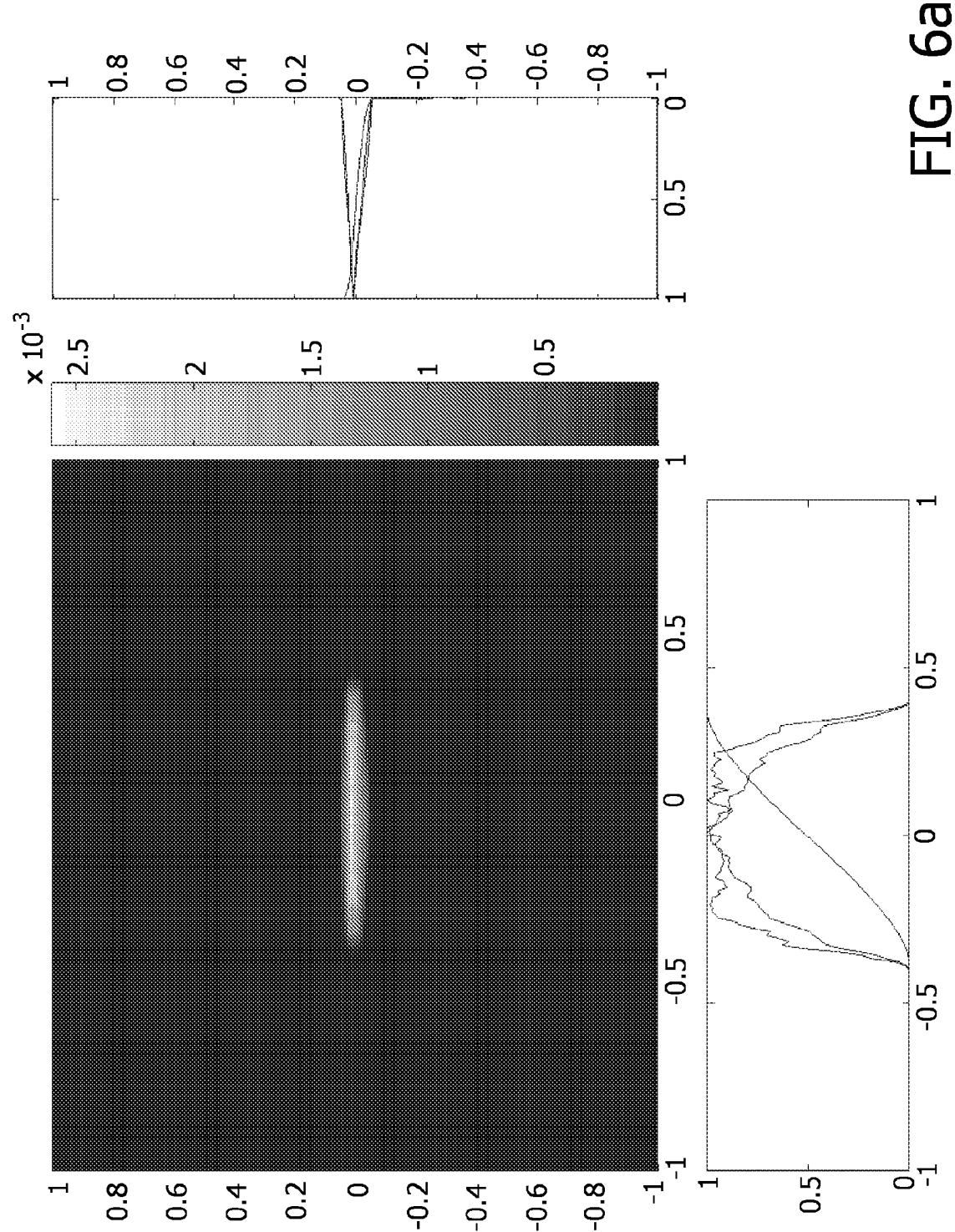
Figure 6B:
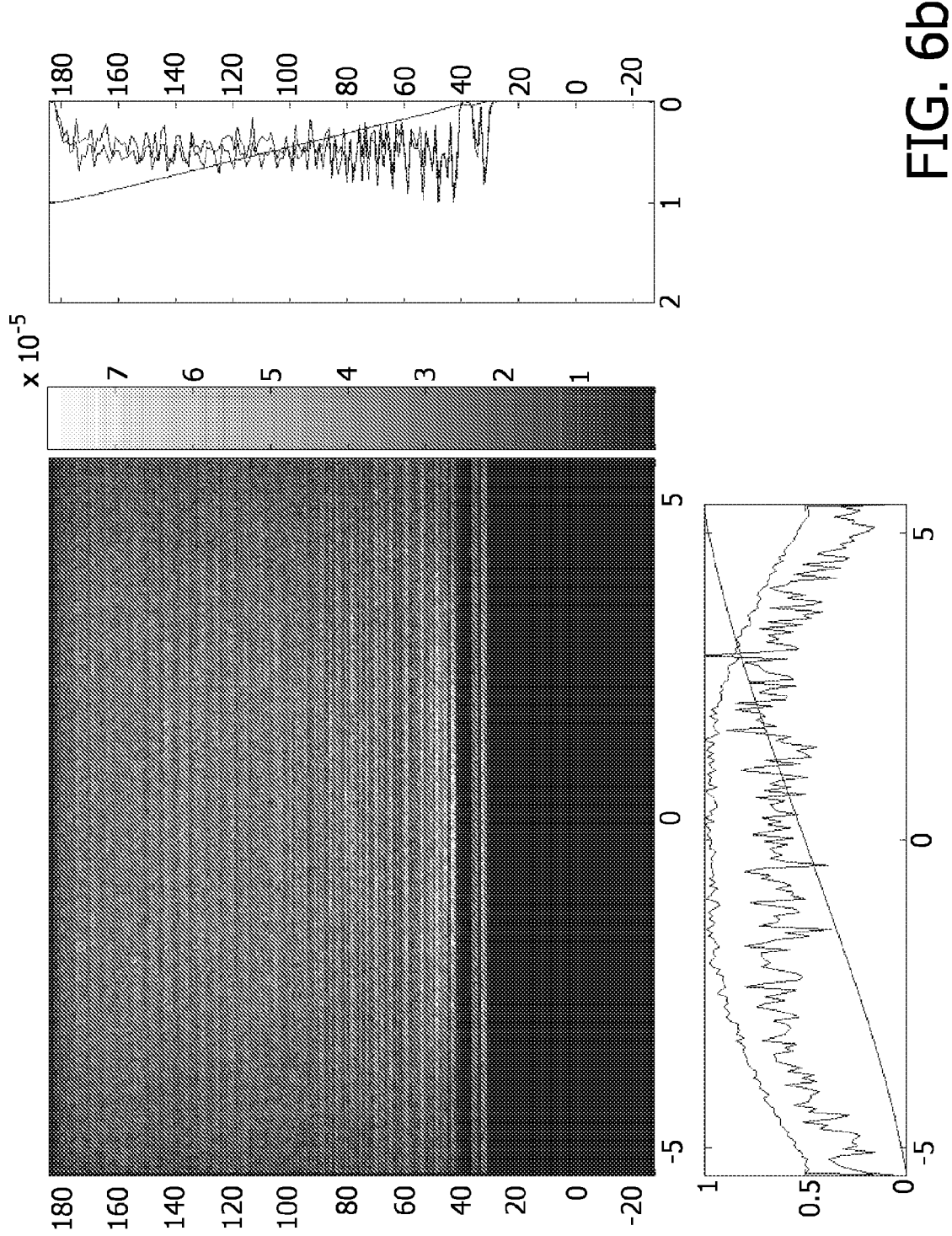

FIG. 6a to b shows results from one of the experiments below.

Figure 7A:
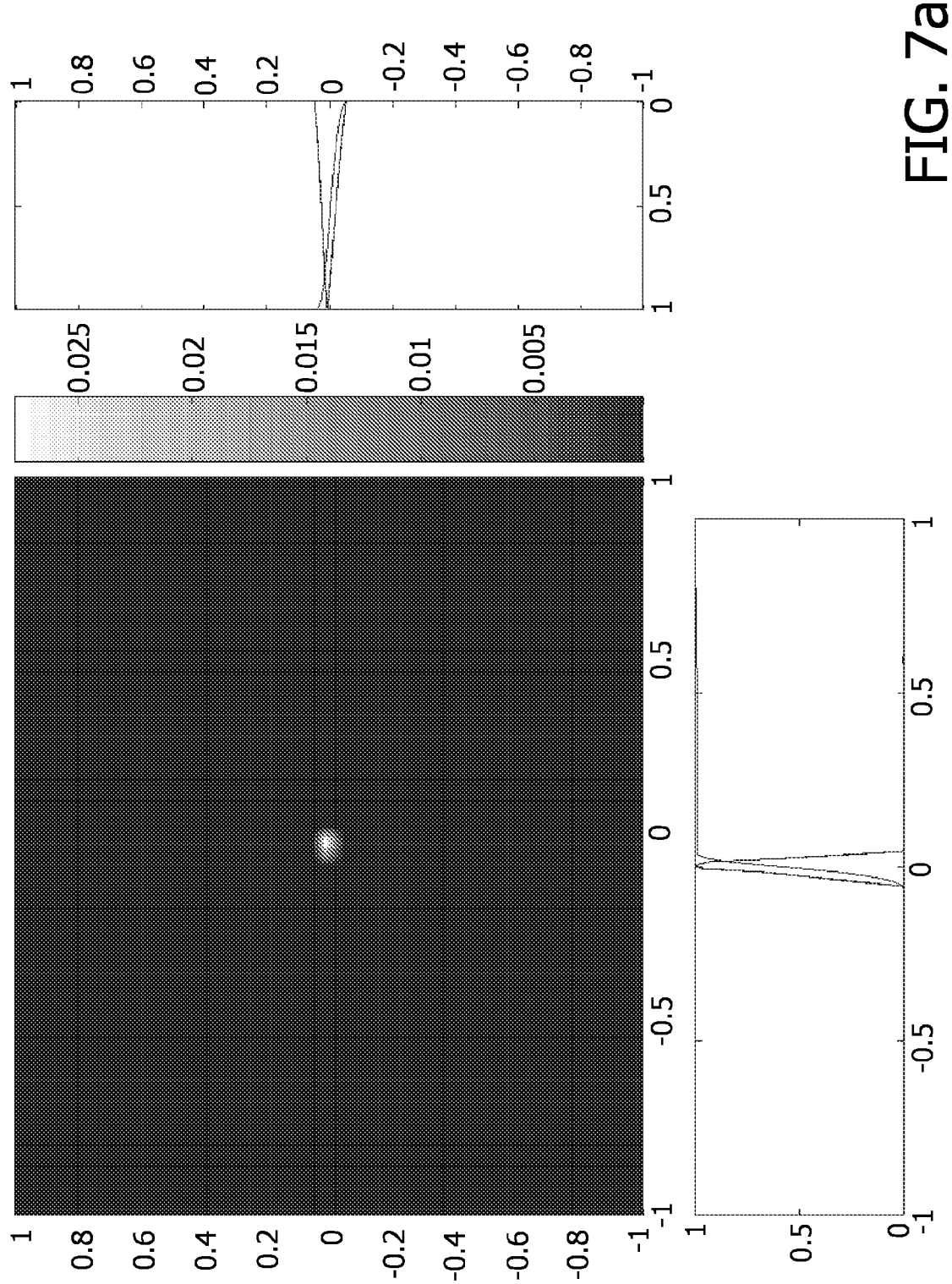
Figure 7B:
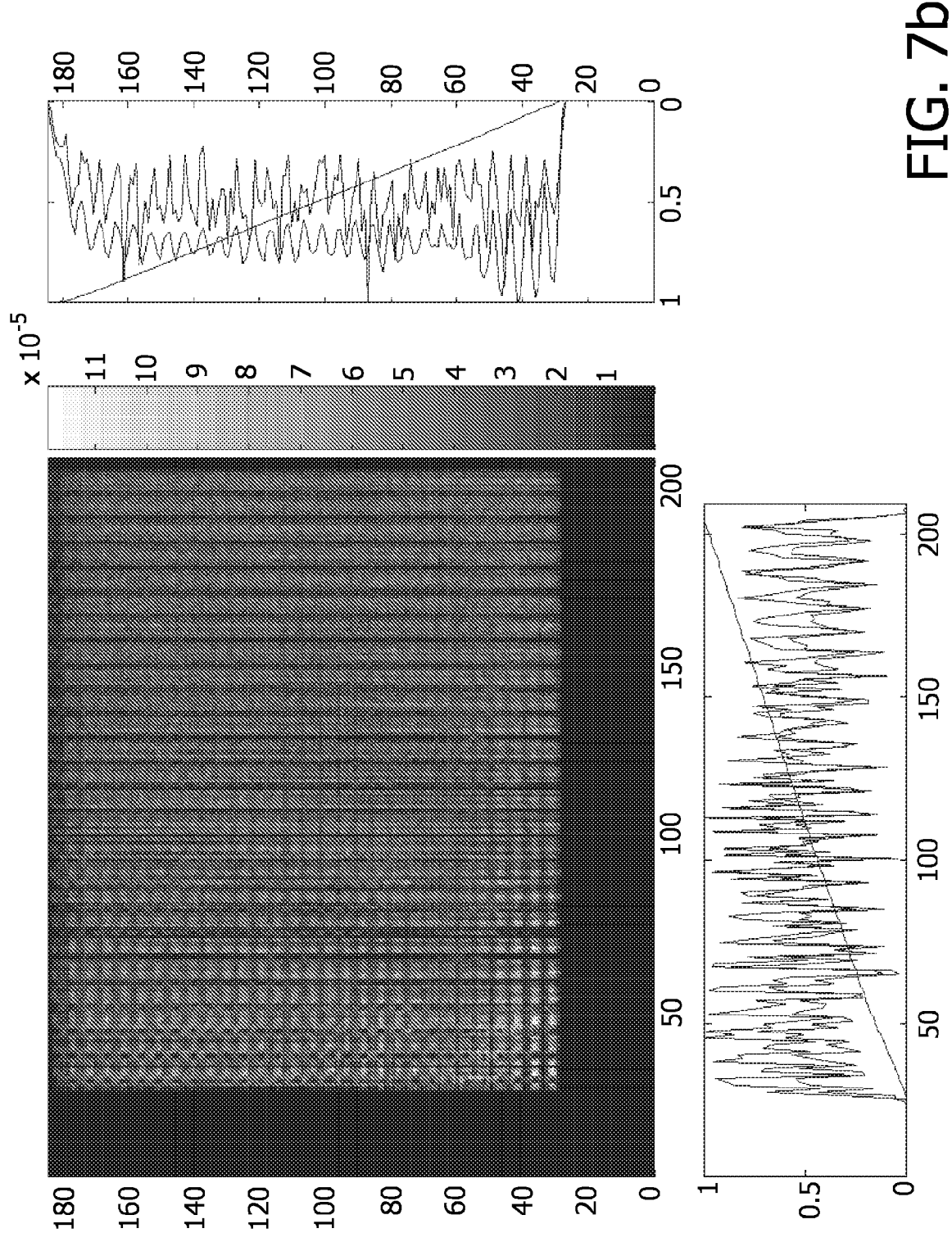
Figure 7C:
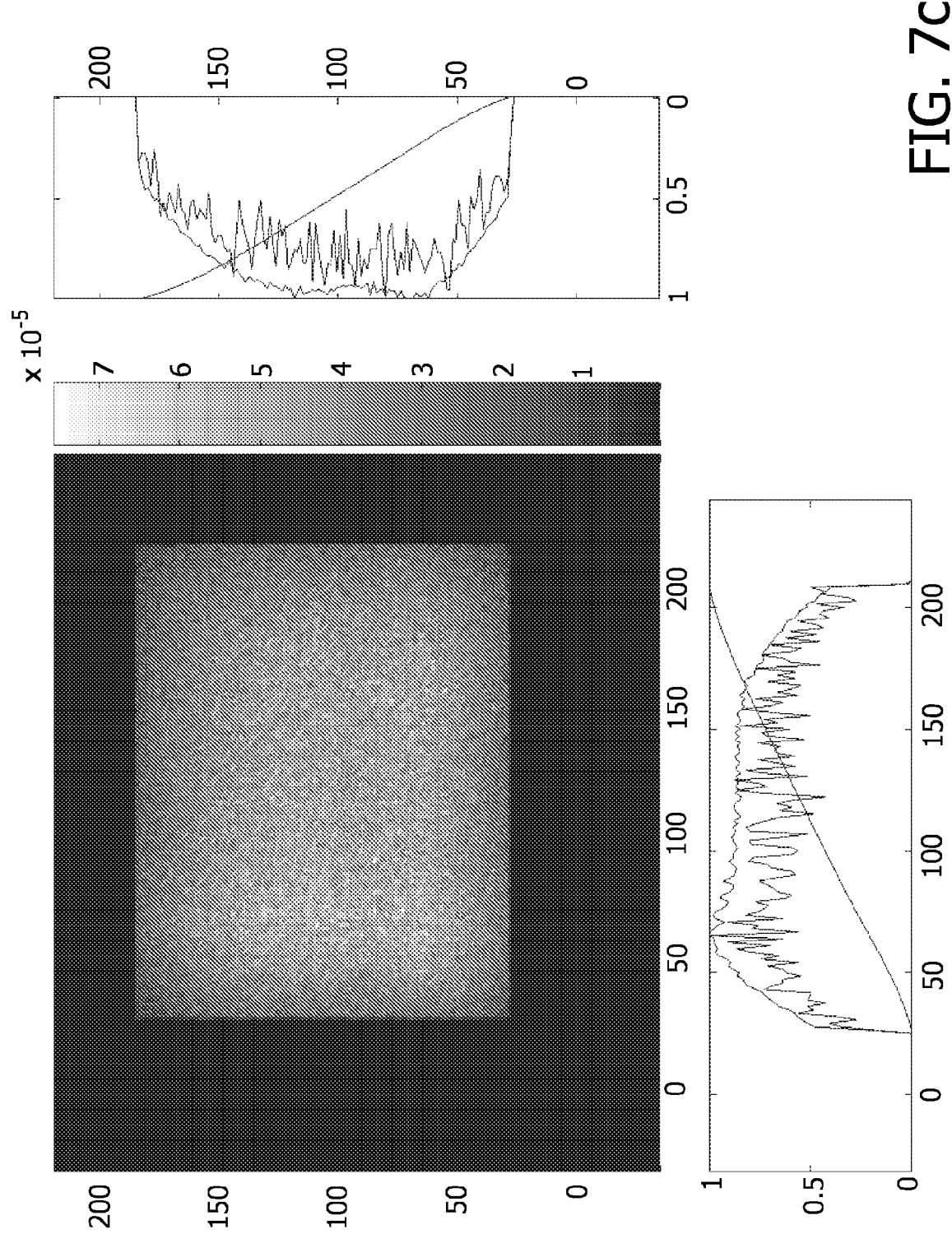
Figure 8A:
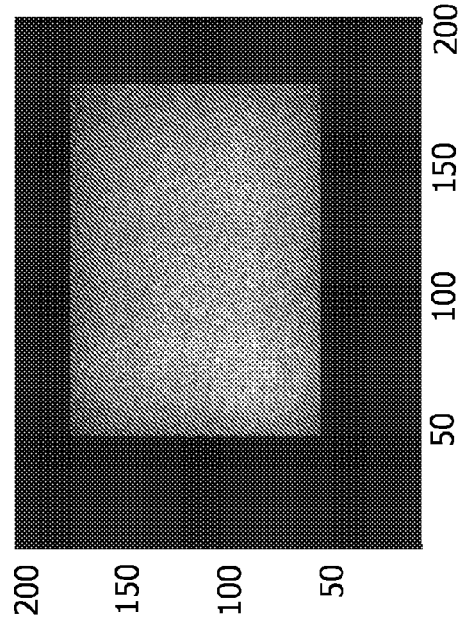
Figure 8C:
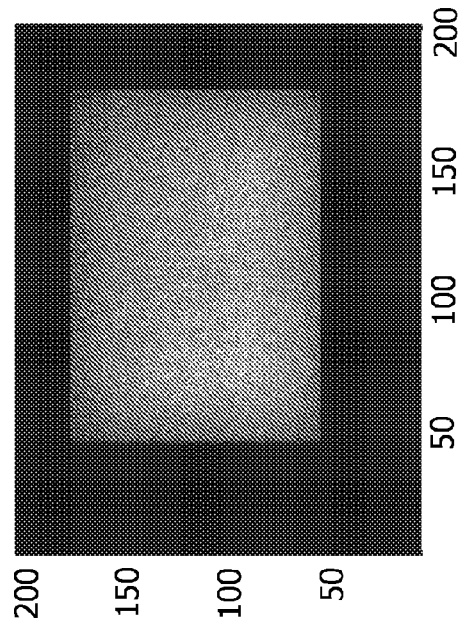
Figure 8B:
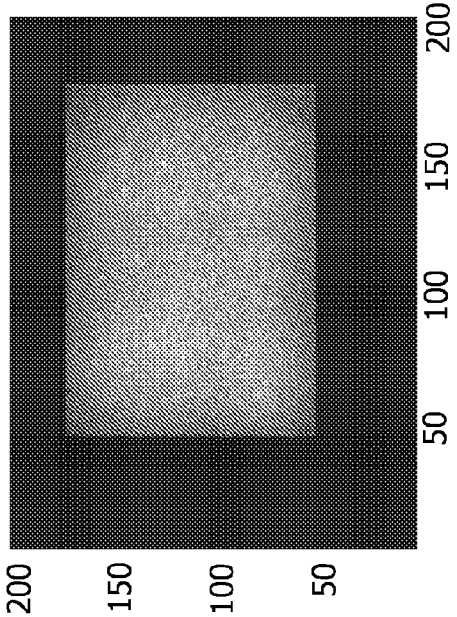
Figure 8D:
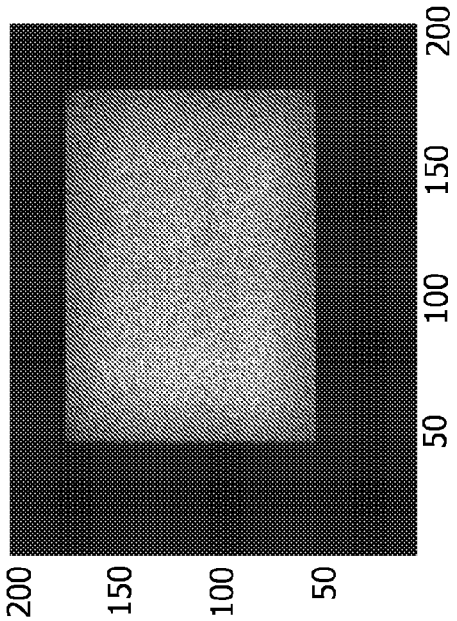

FIG. 7a to c shows results from one of the experiments below.

FIG. 8a to d shows results from one of the experiments below.

The present invention relates to a light collimation device comprising a wave guide plate having a first surface, a faceted second surface comprising a plurality of essentially planar parallel portions and a plurality of facets, each formed at a non-right angle to said planar parallel portions and connecting said planar parallel portions, and at least one surface for receiving light.

Figure 1A:
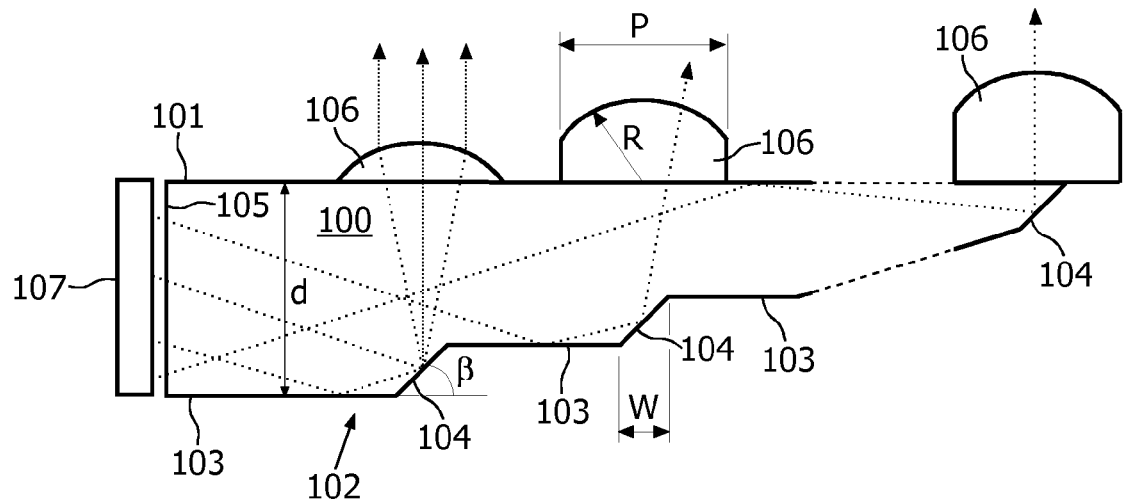
FIG. 1a illustrates, in cross-sectional view, a collimating device of the present invention, where the lenses are arranged on the first surface of the light guide plate.

An exemplary embodiment of a light collimation device is shown in FIG. 1a, illustrated in cross-sectional view.

The light collimation device comprises a wave guide plate 100, which has a front surface 101, a faceted back surface 102 comprising a plurality of essentially planar parallel portions 103 and a plurality of facets 104, each formed at an angle β to the planar parallel portions 103 and connecting the planar parallel portions. Further, the light-collimating device comprises at least one surface 105 for receiving light. A light source 107 is arranged to emit light onto the surface 105 for receiving light. The light source may be of any type, including, but not limited to, incandescent bulbs, fluorescent tubes, gas discharge lamps and light emitting diodes (LEDs), encompassing both inorganic based LEDs and organic based LEDs, such as OLEDs and polyLEDs.

The front surface 101 is provided with a plurality of lenses 106, each of which corresponds to a separate facet 104, such that each lens 106 is located in the beam path of at least the major part of light being reflected on the corresponding facet and extracted from said wave guide plate 100.

The term "major part", as used herein, refers to that at least 50, such as at least 75, for example more than 90% of the light reflected on a facet 104 and extracted out from the light guide plate 100 is received by the corresponding lens 106.

As used herein, the terms "front surface" and "front side" are used to denote the surface/side of the device towards which light reflected on the facets is redirected upon reflection. Thus, in the case where the angle (β) is 0°<β<90°, the front surface means the first surface. On the other hand, where the angle β is 90°<β<180°, the second surface is the front surface.

In the device shown in FIG. 1a, β is <90° and the first surface is the front surface. In the device shown in FIG. 1b, β is >90°, and the second surface is the front surface.

Light received via the surface 105 at an angle exceeding the critical angle for total internal reflection propagates within the wave guide due to total internal reflection on the front surface 101 and the planar parallel portions 103 of the back surface 102. However, when the light encounters a facet surface 104, the light is reflected thereon towards the front surface 101 with an angle of incidence substantially below the critical angle for total internal reflection on the front surface, such that at least a part of this light is extracted out from the wave guide. A lens 106 is arranged on the front surface 101 having such a width P that the major part of light reflected on a facet 104 and extracted from the wave guide 100 is collimated by the lens 106.

Due to the staircase profile of the wave guide and since each facet has a corresponding collimating lens, essentially all light is extracted and collimated after a finite number of facets.

The pitch of the facets in a device of the present invention, i.e. the distance from the center of one facet to the center of an adjacent facet (and thus typically also the pitch of the lenses), depends on the application of the device and on the size of the light source. For example, for a device being adapted to a 1×1 mm LED-chip as a light source, the pitch is typically in the range of from about 0.1 mm to about 10 mm, for example from about 1 to 5 mm. However, larger and smaller pitches are also possible to use. Typically, suitable pitches scales with the size of the light source. Typically, the width P of the lenses 106 is equal or close to the pitch of the facets.

Typically, the focal point of each lens 106 is located on or in the proximity of the corresponding facet 104. For example, the focal point of a lens may be located along an imagined line going through the corresponding facet, forming an angle γ (γ=2β) to the parallel back side portions 103. For β=45°, γ=90°, this means that the focal point of the lens should be above, on or below the facet, but within the width of the facet.

The ratio between the focal length of a lens 106 and the distance between the optical center of the lens and the corresponding facet 104 (measured along the above-mentioned imaginary line) may be in the range of about 1.2:1 to about 1:1.2. In other words, the difference between the focal length and the above-mentioned distance may be about ±20%, for example about ±10%, such as about ±5%, for instance about ±3% or even lower, such as about ±1%. The lower the difference is, the higher the theoretically maximum obtainable collimation becomes. Preferably, the focal plane of the lens 106 intersects with the corresponding facet 104, and more preferable, the focal point of the lens 106 is located on the corresponding facet 104, most preferably on the middle of the corresponding facet 104.

Typically, the focal length of the lenses for a device adapted for a 1×1 mm LED as light source is in the range of from about 1 to 20 mm, such as in the range of from 3 to 15 mm. However, longer and shorter focal lengths are also possible to use, depending on the application of the device and the index of refraction of the wave guide. However, suitable focal lengths depend on the thickness d of the wave guide plate 100, which thickness, as noted above for the pitch, scales with the size of the light source.

As will be appreciated by those skilled in the art, the present invention is not limited to the use of conventional lenses for focusing the light from the facets. On the contrary, many types of collimating refractive elements may be used. Such refractive elements include, but are not limited to thick and thin lenses, Fresnel lenses and holographic elements. In addition, such a refractive element may be composed by a plurality of such lenses and/or holographic elements. For example, each refractive element may consist of a set of lenses which set has an effective focal point on or near the corresponding facet, as is described above.

The angle β, with which the facets 104 are formed from the parallel back surface portions 103, is typically in the range of from about 15 to 75°, for example from about 35 to 55°, such as about 45°. At an angle β of 45°, γ=90° (2β), and in such cases, the lens 106 is preferably arranged straight above the corresponding facet 104.

The height of the facets, i.e. the vertical distance between two adjacent parallel back side portions, is typically in the range of from about 0.1 to 2 mm, such as from 0.3 to 0.7 mm. However, larger and smaller heights are also possible to use, depending on the application of the device. The height of a facet is typically much smaller than the focal length of the corresponding lens.

In FIG. 1, all facets are illustrated forming essentially the same angle β. However, the present invention also encompasses the possibility that each facet individually forms a different angle β. For instance, by gradually increasing β with the distance from the light receiving area, and locating the lenses accordingly, a converging light may be obtained by a device of the present invention.

As the wave guide 100 in FIG. 1a becomes gradually thinner with the distance from the light receiving area 105, the distance from the facets to the front surface 101 of the wave guide 100 also decreases. In order to maintain the ratio between the focal length of the lens and the distance of between the lens and the corresponding facet, the optical center of the lens may be arranged at a gradually increasing distance from the front surface 101, as is illustrated in FIG. 1a, in order to maintain the desired ratio.

Alternatively, the strength of the lenses 106 may increase correspondingly (i.e. decreasing the focal length of the lens).

Yet another alternative is to arrange an array of lenses where the base of all lenses is in one plane on a wedge arranged on the front surface to place the lenses on the same distance from the facets.

Materials suitable for use for the manufacture of the wave guide and the lenses of a light collimating device of the present invention includes, but are not limited to, transparent glass materials, transparent ceramic materials and transparent plastic materials, such as for example polymethylmethacrylates (PMMA), polycarbonates (PC) or polystyrenes (PS). The wave guide and the lenses may be of the same or different materials.

In order to obtain the total internal reflection on the front surface 101 and the parallel planar portions 103 of the wave guide, the refractive index of the wave guide material should be higher than the refractive index of the surrounding materials. Thus, it is desired that the lenses 106 arranged on the front surface 101 is of a material having a refractive index lower than the wave guide 100, or alternatively, that a material is arranged between the lenses and the wave guide, which material has a refractive index that is lower than refractive index of the wave guide material. Typically, an adhesive is arranged to bind the lenses to the light-guide, which adhesive has a refractive index lower than the refractive index of the wave guide. This allows for the lenses and the wave guide to be made of the same material or of materials having essentially equal refractive indices.

In order to reduce Fresnel losses in the interface between the wave guide and the adhesive, and in the interface between the adhesive and the lenses, the refractive index of the adhesive should be as close as possible to the indices of the lenses and wave guide, respectively. Nevertheless, the refractive index of the adhesive should be lower than the indices of the lenses and wave guide in order to allow total internal reflection within a reasonable angular range.

Each slanted facet 104 should reflect light at a high efficiency towards the corresponding lens. For that purpose, the facets may be provided with a reflecting surface. Alternatively, the reflection on the facets may rely on total internal reflection at the interface between the facets and the material on the backside of the wave guide.

The collimation angle of light exiting a light collimating device of the present invention may varied by choosing a number of parameters as will be discussed below, but typically a collimation of down to below 5°, preferably below 3°, more preferably below 1.5° or even lower, such as below 1°, in at least one dimension, is possible to achieve with a light collimating device of the present invention.

As used herein, the term "collimation angle" refers to an angular range within which 98% of the light intensity is contained.

Many light sources, such as light emitting diodes, emit light in a broad angular range. In order to utilize as much of the emitted light in a collimating device of the present invention, it may be advantageous to pre-collimate the light emitted by the light source. The pre-collimation is performed in order to reduce the angular spread such that as much as possible of this light is introduced in the wave guide at angles subject to total internal reflection.

Any collimating structure may be used to obtain this pre-collimation, such as for example a funnel, a CPC structure as mentioned above or a focusing Fresnel lens. The collimating structure is typically arranged close to the surface for receiving light. In embodiments of the present invention, the pre-collimation may be performed by a collimating structure located in the path of light between the surface for receiving light and the facets of the wave guide. Alternatively, the collimating structure for pre-collimation may be arranged in the path of light between the light source and the area for receiving light. Alternatively, when needed, the light source it self may be provided with a pre-collimating structure, such that light within the desired angular range is received via the area for receiving light. For some light sources, such as for example certain side-emitting LEDs, the major part of light is emitted within a desired angular range, and for such no pre-collimation is necessary.

A light emitting device comprising a light source and a light collimating device of the present invention arranged to receive and collimate at least part of the light emitted by the light source forms a preferred embodiment of the present invention.

One advantage with a light collimating device of the present invention is that construction parameters for such a device, given the desired collimating properties is readily derivable from a series of theoretical relationships. The following is a description of the theoretical relationship between a few parameters of a collimating device of the present invention shown in FIG. 1, where the angle β from the planar back surface portions to the facets is 45°.

In these theoretical calculations:

d is the distance from the optical center of a lens to the back surface of the wave guide;

w is the width of the facet 104, taken in a direction parallel to a back surface portion 103;

P is the width of the lens;

R is the radius of the lens.

A first relationship to be met is the requirement that all rays that leave the lens should at most have an angular spread of $\alpha_{out}$. The rays that pass through the center of the lens and start at the edges of the mirror, should fulfill this requirement.

If we assume w<<d and the lens is a thin lens:

$$d > \frac{w*n}{2*\alpha_{out}}; \quad (1)$$

where n is the index of refraction of the wave guide and lens and $\tan(\alpha_{out}) \approx \alpha_{out}$ (small $\alpha_{out}$). In practice, we prescribe $\alpha_{out}$. Once we have chosen w or d, the other parameters are fixed as well.

Secondly, the facet should be in the focus point of the lens such that the lens makes an image at infinity of the facet. The focus length of a lens in a material with an index of refraction n, as we assume for the wave guide and lens, is given by:

$$f = \frac{n}{n-1} R \quad (2)$$

The focus length equals the thickness of the wave guide: f=d. Thirdly, the pitch of the lens should be such that all the light from one facet is captured by the lens above the corresponding facet. If the half-angle of the angular spread of the light in the wave guide is α, we obtain approximately the following relations:

$$P > 2\tan(\alpha) * \left(d - \frac{1}{2}w\right) \approx 2\tan(\alpha) * d \quad (3)$$

where we assume that w<<d.

Fourthly, it is required that the width o the lens is less than the diameter of the lens:

$$P < 2R \quad (4)$$

To summarize, we obtain the following inequalities:

$$d\frac{n-1}{n} = R > \frac{1}{2}P > \tan(\alpha) * d \quad (5)$$

Consequently, the angular spread in the wave guide should be less than the $\alpha$ derivable from the following equation:

$$\tan(\alpha) < \frac{n-1}{n} \quad (6)$$

For n=1.5, this gives $\alpha < 18°$.

To obtain reasonable values for the parameters, we reason as follows. Assuming having a light source with an etendue E (in one direction), there holds $$E = n * d * \alpha \quad (7)$$

Thus, together with the above requirement (6) on the relationship between n and $\alpha$, the parameter d can be chosen. Together with relation (1) above and the required amount of collimation, the width w of the mirrors follows.

The total length of the wave guide is given by:

$$L = P * N \quad (8)$$

where N is the first integer larger than the quotient d/w.

The calculated value of $\alpha$ (the angular spread in the wave guide) also gives a maximum desired value on the refractive index for a layer (such as an adhesive) arranged between the wave guide and the lenses. The adhesive should be selected to fulfill the requirements on total internal reflection within the wave guide for light with an angular spread lower than $\alpha$, such that $90°-\alpha$ (the angle of incidence of the wave guided light on the front surface) is higher than the critical angle $\theta_C$:

$$90 - \alpha > \theta_C = \arcsin\left(\frac{n_{adhesive}}{n_{waveguide}}\right) \quad (9)$$

For example, for a wave guide having a refractive index $n_{waveguide}$ of 1.5 and a angular spread $\alpha$ of received light of ±18°, the refractive index of the adhesive $n_{adhesive}$ should be less than 1.423. This is lower than the refractive index of the wave guide, but is a high index for an adhesive.

Figure 2:
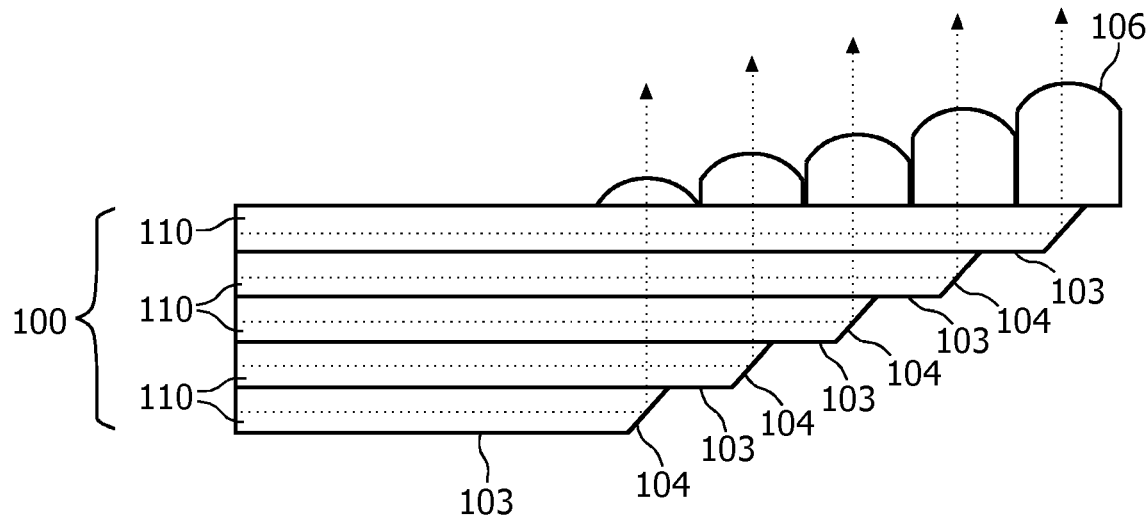
FIG. 2 illustrates, in cross-sectional view, another embodiment of a collimating means of the present invention.

In a second embodiment, as shown in FIG. 2, the wave guide 100 may comprise a plurality of superimposed layer 110. Each such layer has a front surface, a back surface 103 and a facet 104 connecting the back surface with the front surface. When the layers 110 are arranged on each other, the resulting wave guide has essentially the same appearance and properties as in the above mentioned embodiment.

Between each of the layers 110, an adhesive compound may be arranged to bind the layers together. Such adhesive compound may typically be an transparent compound having a refractive index lower than that of the layer material. Thus each separate layer 110 may act as a separate wave guide, since the light in each layer 110 is subject to total internal reflection in the front and back surfaces. However, when light in a layer 110 encounters a facet 104, the light is reflected thereon towards the lenses, and at least part of this reflected light will be extracted from the wave guide, as the angle of incidence on the interface between two separate layers or between the uppermost layer and the lens array will be below the critical angle for total internal reflection. One advantage with this embodiment is that different separate light sources, for example of different colors, may be associated with separate layers 110 and the light from each such light source will only be collimated by the lens(es) corresponding to the layer (s) with which that light source is associated.

The device illustrated in FIG. 1 is a cross sectional view of a general embodiment of a light collimating device of the present invention. However, in a practicable embodiment of a device of the present invention, the light collimating device is a three dimensional structure. For illustrative purposes, two different three-dimensional structures are provided herein in the FIGS. 3 and 4.

Figure 3A:
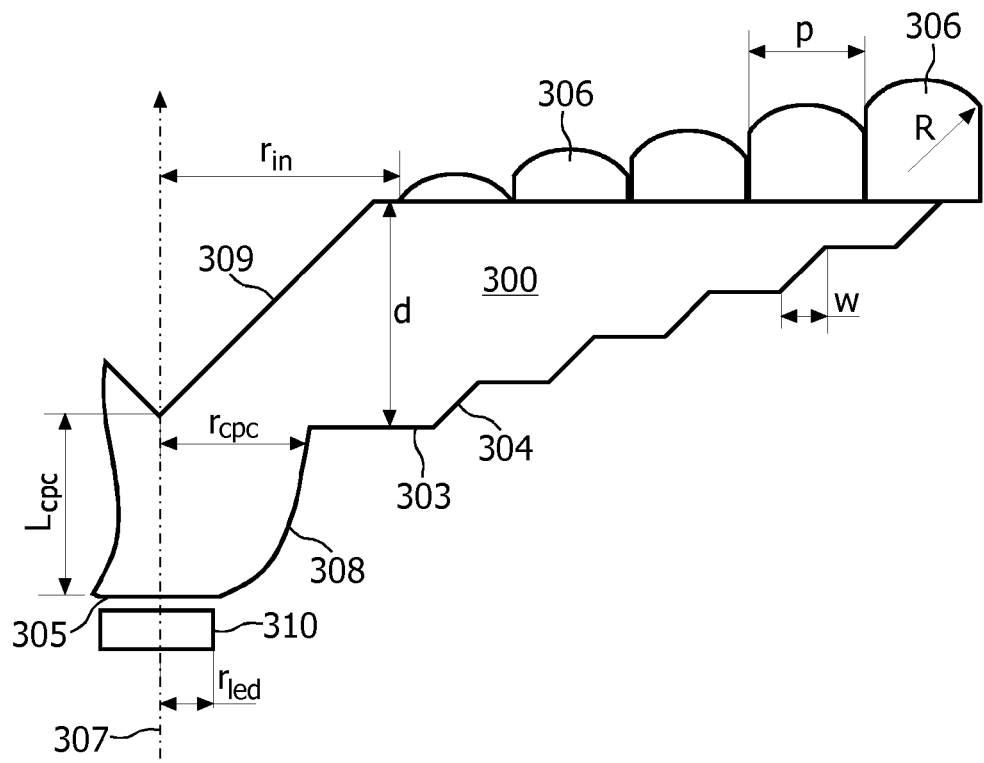
FIG. 3a illustrates, in cross-sectional view, a rotationally symmetric collimating device of the present invention.
Figure 3B:
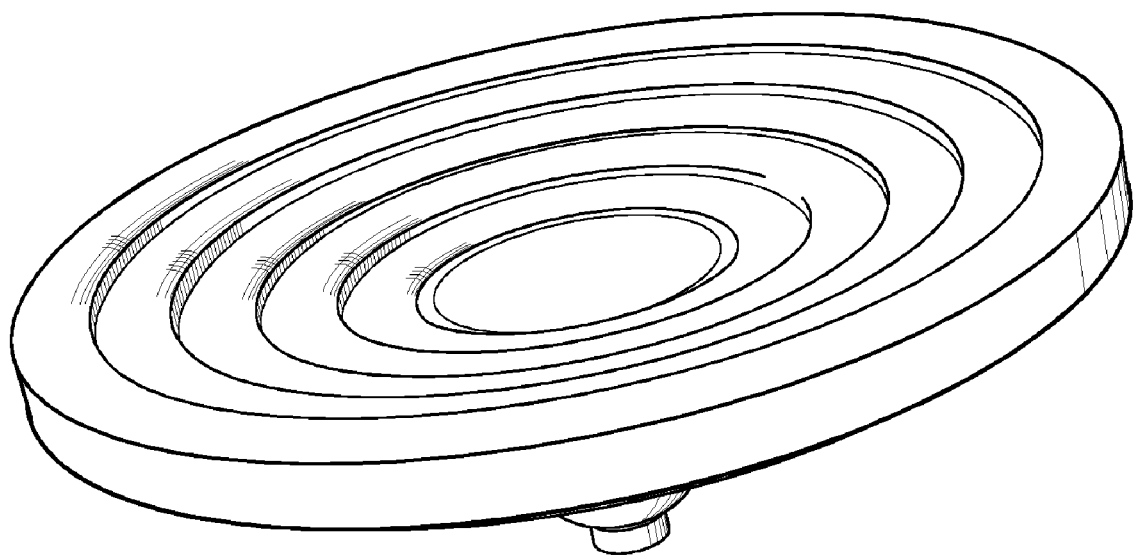

In FIGS. 3a and 3b is illustrated a rotationally symmetric embodiment of a light collimating device of the present invention. As will be realized by those skilled in the art, also a device having a n-fold symmetry, where n is any integer from 2 to, typically in the range of 2 to 16 may be realized having a cross section as the one described here for the rotationally symmetric (n=∞) embodiment. Such n-fold symmetric devices are also encompassed by the present invention.

FIG. 3b illustrates a perspective view of the device illustrated in FIG. 3a.

In the embodiment shown in FIG. 3, a collimating structure 308, here illustrated as a CPC-structure, is arranged in the path of light between the surface for receiving light 305 and the facets 304 of the wave guide 300. A cone 309 redirects the light collimated by the CPC-structure towards the facets 304. The reflection on the surface of the cone 309 may be due to total internal reflection or a reflective coating on the surface. The reflections on the surface of the CPC-structure 308 may be due to total internal reflection of a reflection coating on the surface.

The collimating structure 308 is not limited to a CPC-structure, and as will be realized by those skilled in the art, any collimating structure may be used in order to provide the desired angular range $\alpha$.

The collimating device in this embodiment is rotationally symmetric with regard to a symmetrical axis 307 through the surface 305 for receiving light.

A light source 310, typically a light emitting diode, is arranged to emit light, at least a part of which light is collected by the collimating device via the surface 305 for receiving light. The light source 310 together with the light collimating device forms a light emitting device.

The collimating structure 308 is to obtain the desired angular spread $\alpha$ in the wave guide, as discussed above. In an alternative embodiment, (not shown) the light source 310 is provided with a collimating structure, such as to provide light having the desired angular spread to the light collimating device of the present invention.

In yet another alternative embodiment, the collimating structure 308 and the redirecting cone 309 are omitted, giving a rotationally (or n-fold) symmetric light collimating device having the cross-section as shown in FIG. 1 a having a symmetry axis to the left of the area 105 for receiving light. Such an embodiment may be especially useful when collimating light from a side emitting light source, such as a side emitting LED. Care should be taken to optionally pre-collimate the light to obtain the desired angular range α in the wave guide, as discussed above.

Figure 4A:
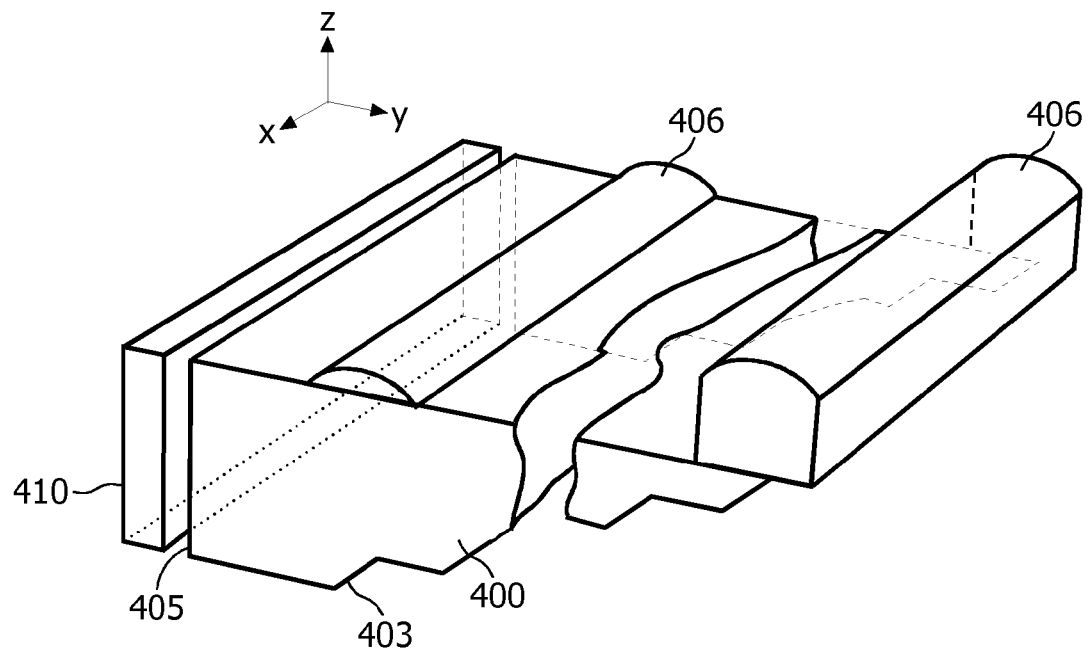
FIG. 4a illustrates, in perspective view, another embodiment of a collimating means of the present invention.

In FIG. 4a is illustrated, in perspective view, a non-symmetrical embodiment of a light collimating device of the present invention, being essentially rectangular in top view.

In this embodiment, each lens 406 and facet 403 is extended in a direction essentially perpendicular to the length of the wave guide plate 400. A device as illustrated in FIG. 4a is only capable of collimating received light in the y-dimension, whereas there is non or little collimation in the x-direction.

Figure 4B:
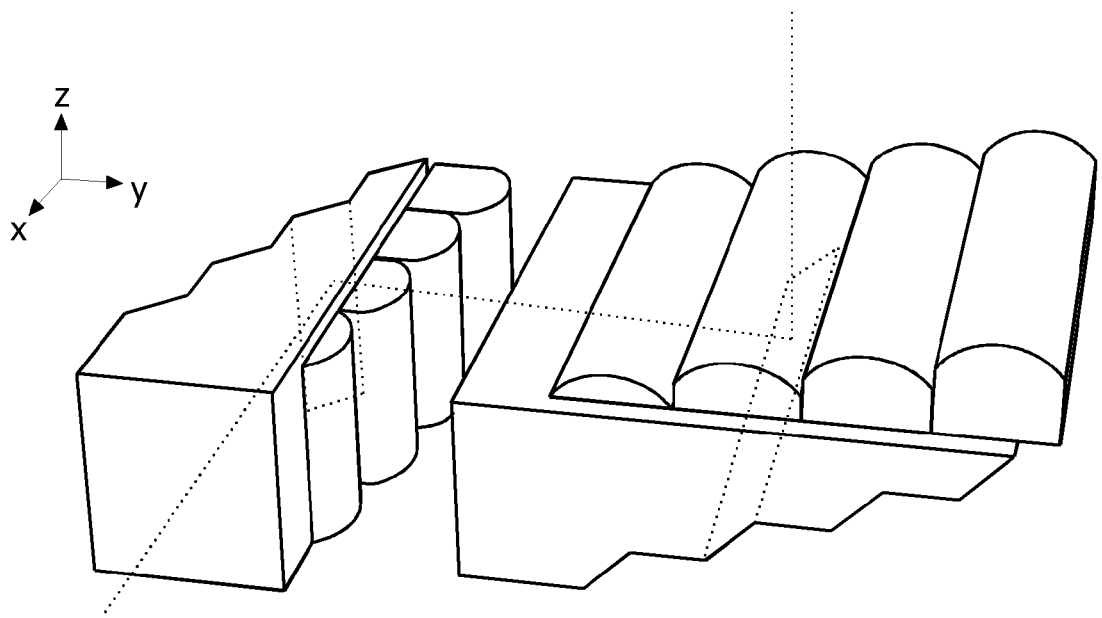

Yet another embodiment of the present invention, as illustrated in FIG. 4b utilizes two light collimating devices of the type illustrated in FIG. 4a. The first device is arranged to obtain a light collimation in the x-direction. The second device is arranged to obtain a light collimation in the y-direction, and is located such that the area for receiving light receives light exiting the lenses of the first device. Thus, the first device provides a collimation in the x-direction, and the second device provides a collimation in the y-direction. Further, the parameters may be different for the first and the second collimating device, thus providing a collimation device where the x-collimation and y-collimation independently may be different.

The person skilled in the art realizes that the present invention by no means is limited to the preferred embodiments described above. On the contrary, many modifications and variations are possible within the scope of the appended claims. For example, as is shown in FIG. 4a, the light source 410 is arranged to emit light directly on the area 405 for receiving light. In alternative embodiments, a light redirecting means, such as for example a folding mirror or an optical fiber, is arranged between the light source and the collimating device. Such a redirecting means provides a greater freedom regarding the location of the light source in respect to the collimating means. Typically, a folding mirror is arranged between the light source and the area for receiving light, such that the light source may be arranged under the collimating device. Light emitted by the light source is thus redirected by the folding mirror towards the receiving area of the collimating device.

Figure 1B:
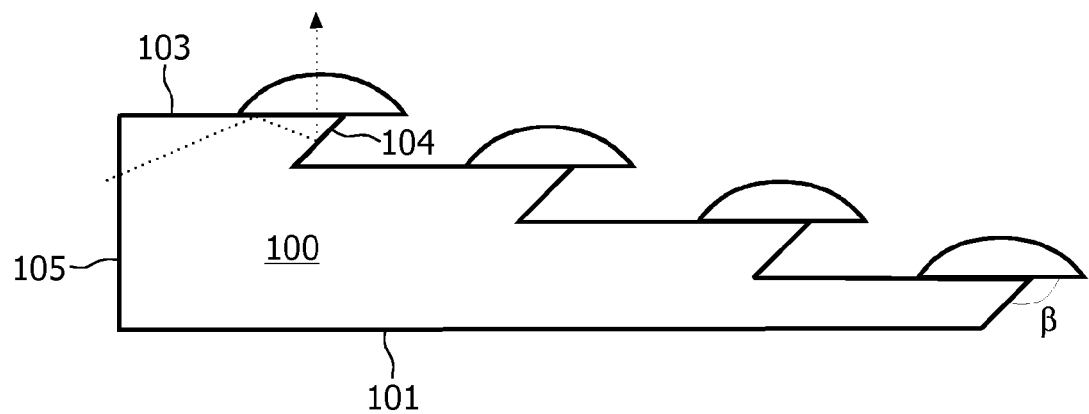
FIG. 1b illustrates a corresponding device wherein the lenses are arranged on the second surface of the present invention.

Further, in the collimating devices illustrated in FIGS. 3 and 4, the angle β with which the facets are formed is below 90°, and the lenses are arranged on the first surface side of the light guide plate. As is recognized by those skilled in the art, variants of these embodiments, where the angle β is above 90° and the lenses consequently are arranged on the second, stair case shaped, side of the wave guide plate, as is illustrated in FIG. 1b, are also encompassed by the scope of the present invention.

Further, the light source providing light to be collimated by a light collimating device of the present invention may be any light source, not limited to the use of LEDs for providing light. Examples of such light sources include incandescent light bulbs, discharge lamps and fluorescent lamps.

A light collimating device or a light emitting device of the present invention may generally be used in any application in the field of lighting where a high degree of collimation may be desired from a compact collimating optics. Examples includes, but are not limited to back lights in display devices, vehicle lighting, indoor lighting, image projection systems, etc.

To summarize, the present invention relates to a light collimation device comprising a wave guide plate having a first surface, an opposing faceted second surface comprising a plurality of essentially planar parallel portions and a plurality of facets connecting said planar parallel portions and at least one surface for receiving light.

Each facet is formed at a non-right angle β to said planar parallel portions and the device further comprises a plurality of lenses, wherein each lens corresponds to a separate facet, and is located in the beam path of at least the major part of light being reflected on the corresponding facet and extracted from said wave guide plate.

EXAMPLES

Light collimating devices of the present invention has been investigated by means of computer simulations (ray-tracing) to test the properties of the devices.

For these calculations, the software an internal software package similar to tools like ASAP of BREAULT Research was used on a compatible computer system.

Graphical results of angular distribution measurements in the experiments below are represented by:

(i) An intensity plot showing the intensity of light for different viewing angles. The intensity of light is shown as different grey scale tones, with higher intensity for brighter gray scale tones. The intensity values are arbitrary. The values on the x- and y-axis represents the sinus value of the viewing angles (from −1 to +1).

(ii) Diagrams showing the normalized intensity (from 0 to 1) through the center of the intensity plot in x- and y-direction respectively.

Graphical results of spatial distribution measurements in the experiments below are represented by:

(i) An intensity plot showing the intensity of light for different coordinates. The intensity of light is shown as different grey scale tones, with higher intensity for brighter gray scale tones. The intensity values are arbitrary. The values on the x- and y-axis are given as distance in millimeters from a reference point. (ii) Diagrams showing the normalized intensity (from 0 to 1) through the center of the intensity plot in x- and y-direction respectively.

Experiment 1: Properties of Rotationally Symmetric Collimating Device

Here a design of a collimator based on the structure depicted in FIG. 3 is discussed, where the desired angular spread of the exiting light is limited to 1.2°. The radius of the front surface of the collimator was 147 mm, and the light source was modeled as a square LED of 1×1 mm, which emits light uniformly in the half-sphere.

The complete system is described by the parameters presented in FIG. 3a. After some initial trials and educated guesses based on the above analytical estimations, the parameters presented in table 1 was obtained.

TABLE 1

| | |
|---|---|
| P | 4.0 mm |
| R | 3.6 mm |
| w | 0.250 mm |
| D | 8.4 mm |
| Rin | 12.3 mm |
| Rcpc | 6.8 mm |
| Lcpc | 38 mm |
| Rled | 1.4 mm (1 × 2) |
| $n_{waveguide}$ | 1.5 |
| β | 45° |

An air layer (n=1) was simulated between the waveguide plate and the lenses.

The angular spread α in the waveguide was chosen 12°, well below the theoretical upper limit of 18° as described above.

For the above parameters, the resulting angular spread and the spatial distribution of the light are shown in FIGS. 5a and 5b respectively.

FIG. 5a shows the angular distribution in terms of sin (viewing angle) (from −1 to +1).

The detector plane at which those quantities are measured is positioned on top of the construction. It should be observed from FIG. 5a that the angular spread is indeed small.

In FIG. 5b, representing the spatial distribution of light as measured directly on top of the device, the structure of the lenses is clearly visible. This indicates that there is some room for improvement left (for instance increasing the angular spread in the waveguide, or reducing the pitch of the lenses). Furthermore, it is seen that the intensity falls off in the radial direction. Based on that the area of the mirrors increases with the distance from the symmetry axis, a decrease proportional to 1/r is expected.

In many applications, the far field distribution is important. In FIG. 5c, the spatial distribution at a distance of 1 m is shown. The structure of the lenses is not visible anymore (as expected). Furthermore, we observe a nice smooth fall off in the radial direction of the light intensity.

The efficiency of the structure is 93.4%. To a large extend the light loss is accounted for by the glass-air interface at the exit of the collimator (4% Fresnel losses from the lens surface).

Experiment 2: Properties of a Rectangular Embodiment.

Experiment 2a: Collimation in One Dimension

The properties of a rectangular collimator as illustrated in FIG. 4a, with a front surface area of 11×180 mm, were evaluated. The same materials and LED was used as in experiment 1 above. The parameters for this device are shown in table 2.

TABLE 2

| | |
|---|---|
| D | 11 mm |
| W | 0.370 mm |
| R | 4.4 mm |
| P | 2.6 mm |
| β | 45° |

To obtain an acceptable result, the opening angle of the beam in the waveguide in the x-direction had to be limited. As long as the opening angle is less than 15°, acceptable results were obtained. This was achieved by placing a CPC in front of the waveguide in the simulation.

The resulting angular and spatial distribution is shown in FIG. 6a and b respectively.

FIG. 6a shows the angular distribution in terms of sin (viewing angle) (from −1 to +1), and as is clear from the graph, a good collimation is achieved in y-direction, with an angular spread of 1.1°.

In FIG. 6b, showing the spatial distribution as measured directly on top of the device, the structure of the waveguide is clearly visible (light enters the collimation device at y=0).

Experiment 2b: Collimation in Two Dimensions

To obtain a collimator in two directions, the structure used above in experiment 2a was combined with a second one-dimensional collimator, as described above and illustrated in FIG. 4b. Thus, the first collimator collimates the light in the y-direction, whereas the second collimator is provided with the y-collimated light and collimates it in the x-direction. The parameter values used for this second collimator are denoted in table 4.

TABLE 3

| | |
|---|---|
| D | 6.5 mm |
| W | 0.500 mm |
| R | 5.23 mm |
| P | 3.5 mm |
| β | 45° |

The obtained angular and spatial light distribution are shown in FIG. 7a and b respectively. For the angular distribution in FIG. 7a we observe that the angular spread is small, ±1° in x and y direction. For the spatial distribution in FIG. 7b measured directly on top of the device we see a typical pattern that reflects the structure of the device in this embodiment (light enters the second collimator at y=0).

In the far field (1 m from the collimator), the spatial distribution is smooth again, as shown in FIG. 7c. What is remarkable is the steepness with which the light output drops at the boundaries.

The second collimator has a front surface area of 156×185 mm, and the spot illuminated from a distance of 1 m has an area of 170×180 mm. So the area used by the collimating device is close to the theoretical minimal limit.

The light efficiency in this simulation was 64%. By using an adhesive with high refractive index between the wave guide and the lenses, as described above, the efficiency increased to 74%.

Much of the remaining losses occur in the interface between the lenses of the first collimator and the receiving surface of the second collimator. With an anti-reflection layer on the lenses of the first collimator and the receiving area of the second collimator, the efficiency is expected to be further improved.

To investigate the color mixing properties, the LED die was again split into 4 parts and the illumination pattern in the far field (1 m from the collimator) was evaluated for each of those individual LED parts. The results are shown in FIGS. 8a-d for the four different parts of the LED. We observe that the spatial light distribution is nearly the same for all four parts of the LED. This implies that the color mixing is relatively good.

The invention claimed is:

1. A light collimating device comprising a wave guide plate (100) having a first surface (101), an opposing faceted second surface (102) comprising a plurality of planar parallel portions (103) and a plurality of facets (104) connecting said planar parallel portions (103) and at least one surface (105) for receiving light, characterized in that, each facet (104) is formed at a non-right angle (β) to said planar parallel portions (103) and, said device further comprises a plurality of collimating refractive elements (106), wherein each collimating refractive element (106) corresponds to a separate one of the plurality of facets (104), and each collimating refractive element (106) is located in the beam path of at least the major part of light being reflected on the corresponding facet (104) and extracted from said wave guide plate (100).

2. A device according to claim 1, wherein said angle (β) with which said facets (104) are formed to said planar parallel portions (103) of the second surface (102) is in the range of from 15° to 75°, and said lenses (106) are arranged on the first surface side of the device.

3. A device according to claim 1, wherein said angle (β) with which said facets (104) are formed to said planar parallel portions (103) of the second surface (102) is in the range of from 105° to 165°, and said lenses (106) are arranged on the second surface side of the device.

4. A device according to claim 1, wherein said collimating refractive element (106) is selected from the group comprising a lens, a Fresnel lens, a holographic element and a plurality thereof.

5. A device according to claim 1, wherein the ratio between the focal length of a refracting element (106) and the distance from the optical center of said refracting element (106) to the corresponding facet (104), is in the range from about 1.2:1 to 1:1.2.

6. A device according to claim 1, wherein the focal plane of a refracting element (106) intersects with the corresponding facet (104).

7. A device according to claim 1, wherein said wave guide plate (100) comprises a plurality of superimposed layers (110) each having a first surface and an opposing second surface, wherein the second surface of each layer comprises at least one planar portion (103) and at least one facet (104) formed at a non-right angle to said planar portion (103).

8. A device according to claim 1, wherein said facets (104) are provided with a reflective coating.

9. A device according to claim 1, comprising a light collimating portion (308) arranged in the optical path between said surface for receiving light (305) and said facets (304) of said wave guide plate (300).

10. A device according to claim 1, wherein the collimation angle of light exiting said device via said plurality of refracting elements (106), which light is received via said surface for receiving light, is below 5°, preferably below 3°, more preferably below 1.5°, in at least one dimension.

11. A device according to claim 1, wherein said wave guide plate has a symmetry axis essentially perpendicular to the planar portions of the wave guide plate.

12. A device according to claim 11, wherein said surface for receiving light is symmetric with respect to said symmetry axis.

13. A device according to claim 11, wherein said wave guide plate is rotationally symmetric with respect to said symmetry axis.

14. A device according to claim 1, wherein said refracting elements (106) is arranged on said wave guide (100) by means of a material having a refractive index lower than the refractive index said wave guide.

15. A device according to claim 1, wherein said surface (105) for receiving light and/or the surfaces of said refracting elements (106) are provided with an anti-reflective coating.

16. A light-collimating device comprising a first and a second light collimating device according to claim 1, wherein said surface for receiving light in said second light collimating device is arranged to receive light exiting said first light collimating device via said refracting elements of said first light collimating device.

17. A light emitting device, comprising a light source and a light-collimating device according to claim 1 arranged to receive light emitted by said light source.

18. A light-emitting device according to claim 17, wherein a folding mirror is arranged between said light source and said surface for receiving light.

19. A display device comprising at least one light collimating device according to claim 1.

* * * * *